United States Patent [19]

Nio et al.

[11] Patent Number: 4,761,596
[45] Date of Patent: Aug. 2, 1988

[54] METHOD OF DETECTING AND CONTROLLING WORK START POINT OF ROBOT

[75] Inventors: Satoru Nio; Hitoshi Wakisako, both of Kitakyushu, Japan

[73] Assignee: Yaskawa Electric Mfg. Co., Ltd., Kitakyushu, Japan

[21] Appl. No.: 868,738

[22] Filed: May 30, 1986

[30] Foreign Application Priority Data

Jun. 1, 1985 [JP] Japan .................................. 60-117711

[51] Int. Cl.$^4$ ............................................. G05B 19/10
[52] U.S. Cl. ..................................... 318/568; 364/513; 901/9; 901/47
[58] Field of Search ........... 318/577, 568, 640, 568 H, 318/568 D, 568 L, 567, 632, 570, 572, 573, 576; 364/176, 167, 168, 169, 170, 513; 901/46, 47, 9; 356/376, 237, 239, 388, 398, 394, 391, 392

[56] References Cited

U.S. PATENT DOCUMENTS

| | | | |
|---|---|---|---|
| 3,888,362 | 6/1975 | Fletcher | 901/47 X |
| 3,976,382 | 8/1976 | Westby | 356/376 |
| 4,305,130 | 12/1981 | Kelley | 364/513 |
| 4,402,053 | 8/1983 | Kelley | 364/513 |
| 4,412,121 | 10/1983 | Kremers | 318/577 |
| 4,567,348 | 1/1986 | Smith | 318/577 |

Primary Examiner—William M. Shoop, Jr.
Assistant Examiner—Patrick C. Keane
Attorney, Agent, or Firm—Cushman, Darby & Cushman

[57] ABSTRACT

A method of detecting and controlling a work start point of a robot of the teaching playback control type is disclosed. The robot has an interpolating function and responds to a position sensor, and a work tool is attached to the robot wrist to be accurately positioned to a work start point of a work object. A shadow of the work tool is produced by an illumination source. The work line of the object, the work tool, and the shadow thereof are image-recognized by a visual sensor. The visual sensor generates position correcting signals along the first and second correcting directions on the basis of the image recognized. The edge of the work tool is moved along the first correcting direction in response to a position correcting signal so as to reduce the distance between the work line and an edge of the work tool on the image recognized. The edge of the work tool is moved along the second correcting direction in response to a position correcting signal so as to reduce the distance between the work tool edge and an edge of the shadow of the work tool on the image recognized. The operations to move the work tool edge in the first and second correcting directions are repeated until the work line, the work tool edge, and the edge of the shadow thereof all coincide on the image recognized.

7 Claims, 8 Drawing Sheets

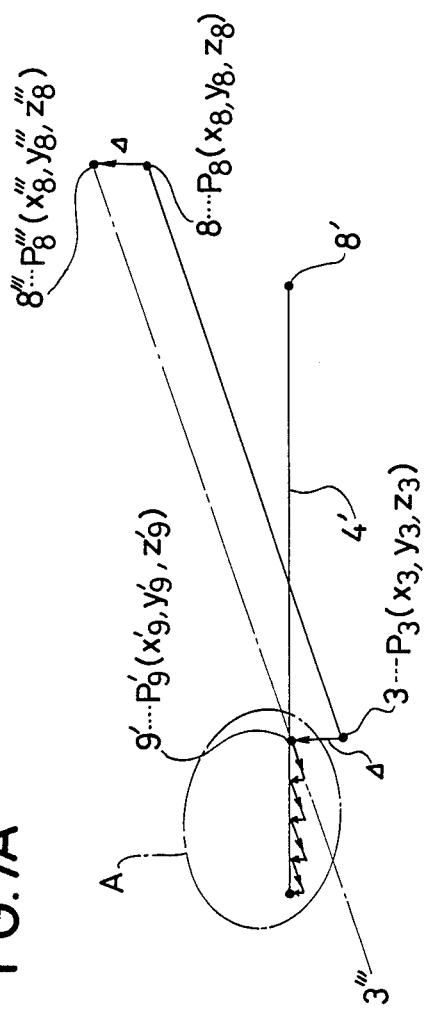
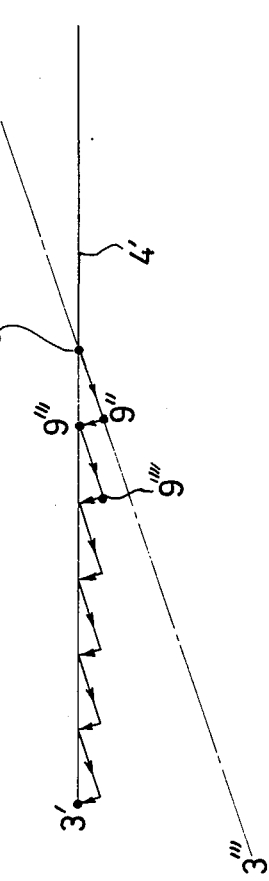
FIG. 7A
FIG. 7B

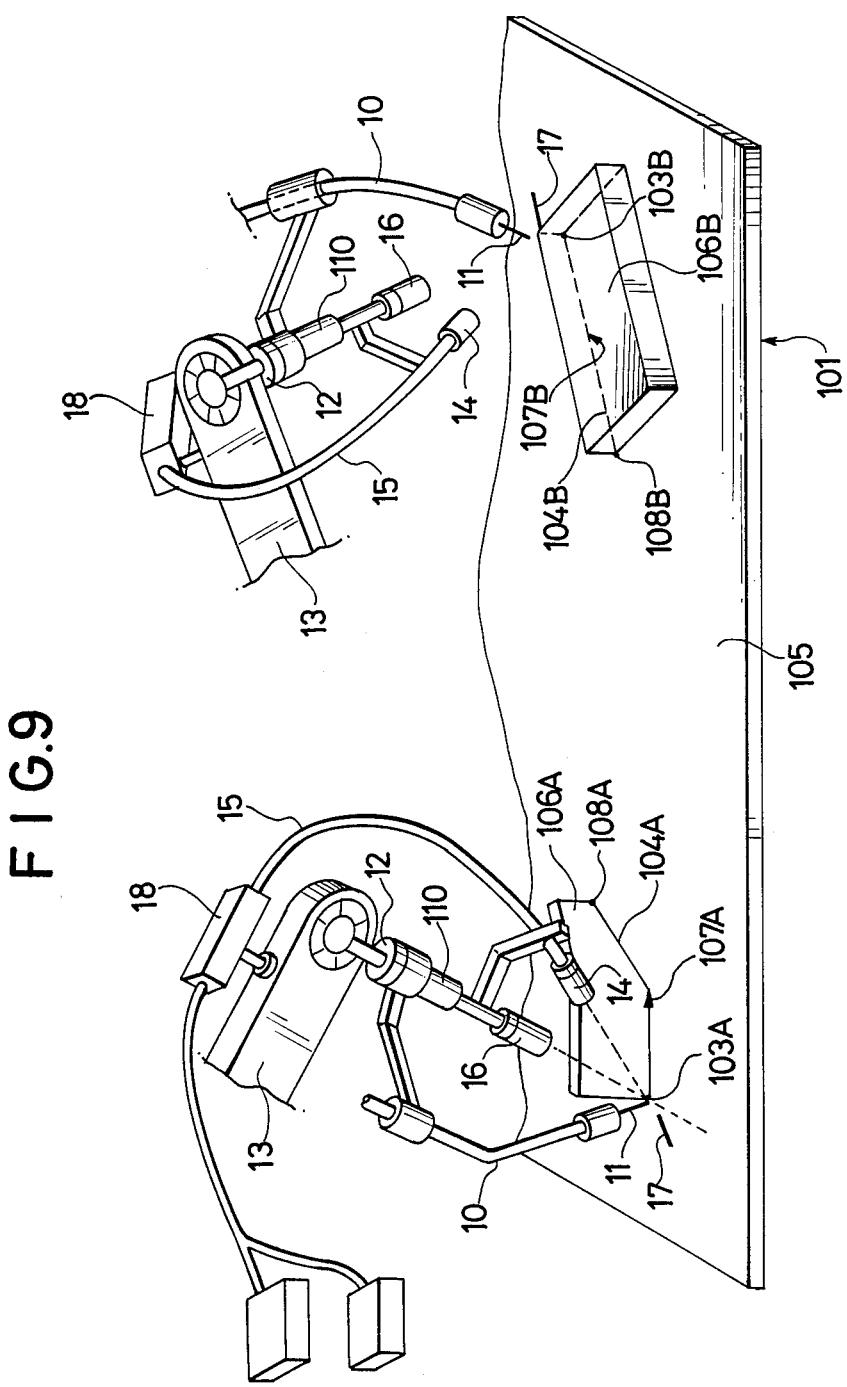

METHOD OF DETECTING AND CONTROLLING WORK START POINT OF ROBOT

BACKGROUND OF THE INVENTION

1. Field of the Invention

The present invention relates to a method of detecting and controlling a work start point of a robot having an interpolating function and a response function to a position sensor.

2. Description of the Related Art

In order to teach playback type robots, a work object must be positioned with a high degree of accuracy so that the locus of the edge of the robot end effector (which has the same meaning as "work tool" hereinafter described) as taught coincides with the work line of a work object. When there is a variation in dimensional accuracy of the work object itself or when the work object is not properly positioned, the robot cannot be worked in accordance with the locus data taught. To solve this problem, robots equipped with a position error detecting sensor have recently been studied and developed, and some of these have already been put into practical use.

As this sensor, various kinds of sensors such as the mechanical type, magnetic type, arc sensor type in which the arc itself is used as an information source, and optical type have been proposed. However, the mechanical type has various drawbacks which are caused because of contact with the object. The magnetic type also has various drawbacks in that the sensor must be arranged near the robot end effector in terms of detection sensitivity. The arc sensor type has the drawback that a high precision cannot be obtained due to variations in welding condition and due to the characteristics of the welding arc itself.

The optical type, however, is excellent in that the shape of the operating work piece can be recognized. In the optical type, a system in which an image signal is obtained due to the reflection of an external light emitting source (e.g., laser slit light) can recognize the line of the work point of the operating workpiece. However, this system has the following drawbacks because the work tool and the work line are relatively positioned based on the assumption that the relative position of the sensor and the working tool never changes. In other words, if the working tool itself deforms or if play, deformation, or deviation of the mechanism to which the sensor is attached occurs, the relative position between the sensor and the work point of the work tool changes, so that they cannot be accurately positioned for the operating work piece. When this point is considered with respect to production technology, the deviation of the operating work piece side is equivalent to the deviation of the robot side including the deviation of the sensor as well. An automated system using a position correcting sensor robot which is constructed on the assumption that all of the robot, sensor, and operating work piece deviate from the normal positions is excellent in terms of production technology, as compared with one using a position correcting sensor robot which is constructed on the assumption that the relative position between the robot and the sensor never changes but the operating work piece deviates from the normal position. With respect to this viewpoint, it is obvious that a sensor system which directly recognizes the relative position between the working tool and the operating work piece is far superior to a sensor system which recognizes only the position of the operating work piece due to the reflection of the external light emitting source.

SUMMARY OF THE INVENTION

It is an object of the present invention to provide a method of detecting and controlling a work start point of a robot whereby a work tool attached to the robot wrist is accurately positioned to the work start point of a work object.

According to one aspect of the invention, there is provided a method of detecting a work start point of a robot of the teaching playback control type having an interpolating function in which a work tool is attached to an edge of an arm and an illumination source and a visual sensor are provided for the wrist portion of the arm, whereby a plurality of drive shafts constituting the robot are controlled in response to position correcting signals from the visual sensor, thereby adjusting the position of the work tool. This method comprises the steps of:

(1) using the illumination source to produce a shadow of an edge of the work tool;

(2) using the visual sensor to image-recognize a work line of a work object, the work tool, and the shadow of the edge of the work tool;

(3) generating a first position correcting signal in a first correcting direction for reducing a first distance between the work line and the edge of the work tool, and generating a second position correcting signal in a second correcting direction for reducing a second distance between the edge of the work tool and the shadow of the edge of the work tool;

(4) moving the edge of the work tool by a constant distance along the first correcting direction in response to the first position correcting signal to reduce the first distance;

(5) moving the edge of the work tool by a constant distance along the second correcting direction in response to the second position correcting signal to reduce the second distance; and (6) repeating the steps (4) and (5) until the work line, the edge of the work tool, and the shadow of the edge of the work tool all substantially coincide on the recognized image.

According to another aspect of the invention, a method of detecting a work start point of a robot of the teaching playback control type having an interpolating function in which a work tool is attached to an edge of an arm, and an illumination source and a visual sensor are provided for the wrist portion of the arm, whereby a plurality of drive shafts constituting the robot are controlled in response to position correcting signals from the visual sensor, thereby adjusting the position of the work tool, the method comprising the steps of:

(1) using the illumination source to produce a shadow of an edge of the work tool;

(2) using the visual sensor to image-recognize a work line of a work object, the work tool, and the shadow of the edge of the work tool;

(3) generating a first position correcting signal in a first correcting direction, the first position correcting signal for reducing a first distance between the work line and the edge of the work tool, and generating a second position correcting signal in a second correcting direction, the second position correcting signal for reducing a second distance between the edge of the work tool and the shadow of the edge of the work tool;

(4) moving the edge of the work tool along the first correcting direction in response to the position correcting signal in order to reduce the first distance;

(5) moving the edge of the work tool along the second correcting direction in response to the position correcting signal in order to reduce the second distance;

(6) repeating the steps (4) and (5) until the work line, the edge of the work tool, and the edge of the shadow of the work tool all substantially coincide on the recognized image; and (7) obtaining a displaced point at which a taught work end point is displaced by a vector between a coincident point as derived in the step (6) and the taught work start point, and deriving a straight line connecting the displaced point and the coincident point;

(8) moving the edge of the work tool along an extension of the straight line and in a direction opposite to the work direction;

(9) again repeating the steps (4) and (5) until the work line, the edge of the work tool and the shadow of the edge of the work tool all substantially coincide on the recognized image;

(10) repeating the steps (8) and (9) until the recognized image of the visual sensor indicates a sharp bend in the work line;

(11) again repeating the steps (4) and (5) until the work line, the edge of the work tool and the shadow of the edge of the work tool all substantially coincide on the recognized image, after the sharp bend is detected.

According to another aspect of the invention, a method is provided for detecting a work start point of a robot of the teaching playback control type having an interpolating function in which a work tool is attached to an edge of an arm and an illumination source, and a visual sensor are provided for wrist portion of the arm, whereby a plurality of drive shafts constituting the robot are controlled in response to position correcting signals from the visual sensor, thereby adjusting the position of the work tool, the method comprising the steps of:

(1) using the illumination source to produce a shadow of an edge of the work tool;

(2) using the visual sensor to image-recognize a work line of a work, the work tool, and the shadow of the edge of the work tool;

(3) generating a first position correcting signal, in a first correcting direction, for reducing a first distance between the work line and the edge of the work tool, and generating a second position correcting signal, in a second correcting direction, for reducing a second distance between the edge of the work tool and the shadow of the edge of the work tool;

(4) moving the edge of the work tool along the first correcting direction, responsive to the position correcting signal, until the work line and the edge of the work tool substantially coincide on the recognized image; and (5) moving the edge of the work tool along the second correcting direction in response to the position correcting signal until the edge of the work tool and an edge of the shadow of the work tool substantially coincide on the recognized image and, at the same time, correcting the position of the edge of the work tool along the first correcting direction until the work line and the edge of the work tool on the image substantially coincide.

Yet another aspect of the invention is defined by a method of detecting a work start point of a robot of the teaching playback control type having an interpolating function in which a work tool is attached to an edge of an arm, and an illumination source and a visual sensor are provided on a wrist portion of the arm, whereby a plurality of drive shafts constituting the robot are controlled in response to position correcting signals from the visual sensor, thereby adjusting the position of the work tool, the method comprising the steps of:

(1) using the illumination source to produce a shadow of an edge of the work tool;

(2) using the visual sensor to image-recognize a work line of a work object, the work tool, and the shadow of the edge of the work tool;

(3) generating a first position correcting signal, in a first correcting direction, for reducing a first distance between the work line and the edge of the work tool, and generating a second position correcting signal, in a second correcting direction, for reducing a second distance between the edge of the work tool and the shadow of the edge of the work tool;

(4) moving the edge of the work tool along the first correcting direction in response to the position correcting signal until the work line and the edge of the work tool substantially coincide on the recognized image;

(5) moving the edge of the work tool along the second correcting direction in response to the position correcting signal until the edge of the work tool and the shadow of the edge of the work tool substantially coincide on the recognized image and, at the same time, correcting a position of the edge of the work tool along the first correcting direction until the work line and the edge of the work tool on the image substantially coincide; and (6) obtaining a displaced point at which a taught work end point is displaced by a vector between a coincident point as derived in the step (5) and the taught work start point, and deriving a straight line connecting the displaced point and the coincident point;

(7) moving the edge of the work tool by a constant distance along an extension of the straight line and in a direction opposite the work direction;

(8) repeating the steps (4) and (5) until the work line, the edge of the work tool and the shadow of the edge of the work tool all substantially coincide on the recognized image;

(9) repeating the steps (7) and (8) until the visual sensor detects a sharp bend in the work line on the recognized image.

Still another aspect of the invention is defined by a method of detecting a work start point in a robot of the teaching playback control type having an interpolating function in which a work tool is attached to an edge of an arm and a visual sensor is provided for the wrist portion of the arm and a contact sensor for generating a contact signal when an edge of the work tool comes into contact with an object to be worked is further provided, whereby a plurality of drive shafts constituting the robot are controlled in response to position correcting signals from the visual sensor, thereby adjusting the position of the work tool, the method comprising the steps of:

(1) using the visual sensor to image-recognize a work line of the work object and the work tool;

(2) generating the position correcting signal, in a first correcting direction, for reducing a first distance between the work line and the edge of the work tool on the basis of the image recognized by the visual sensor;

(3) moving an edge of the work tool along the first correcting direction in response to the position correcting signal until the work line and the edge of the work tool substantially coincide on the recognized image; and (4) moving the edge of the work tool along an axial direction of the work tool until the contact sensor generates a contact signal and, at the same time, correcting a position of the edge of the work tool along the first correcting direction until the work line and the edge of the work tool on the image substantially coincide.

BRIEF DESCRIPTION OF THE DRAWINGS

FIGS. 7A and 7B are diagrams explaining the control method from the state of FIG. 3F to the state of FIG. 3G.

FIG. 9 is a diagram corresponding to FIG. 2 in the case where a plurality of welding start points exist.

DESCRIPTION OF THE PREFERRED EMBODIMENT

An embodiment of the present invention will now be described with reference to the drawings.

An example of a welding torch will be described in detail hereinbelow as one of the working tools that can be used with the present invention. However, a sizing gun, deburring tool, screw fastening tool, clamping hand, or other device could also be used in place of the welding torch for this invention. Therefore, it should be noted that the invention is not limited to welding applications.

Figure 1:
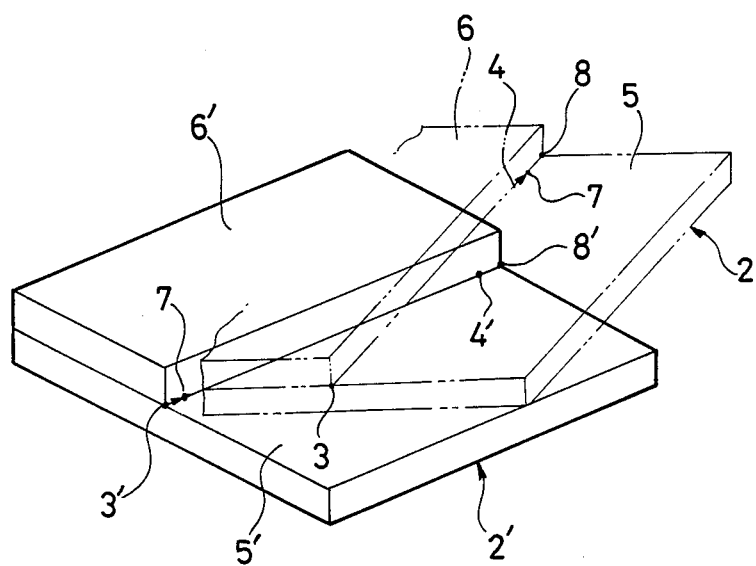
FIG. 1 is a diagram of an example of a lap joint showing a situation in which the welding start point is deviated due to the deviation of a work piece.

FIG. 1 is a diagram of an example of a lap joint, showing a situation in which a welding start point is displaced due to a displacement of a work piece. In the diagram, 1' denotes a taught work position; 2 an actual work position; 3 a taught welding start point; 4 a taught welding line; 3' an actual welding start point; 4' an actual welding line; 5 and 5' lower plates constituting a lap joint; 6 and 6' upper plates of the lap joint; 7 and 7' arrows indicating of the welding directions; and 8 and 8' welding end points.

Figure 2:
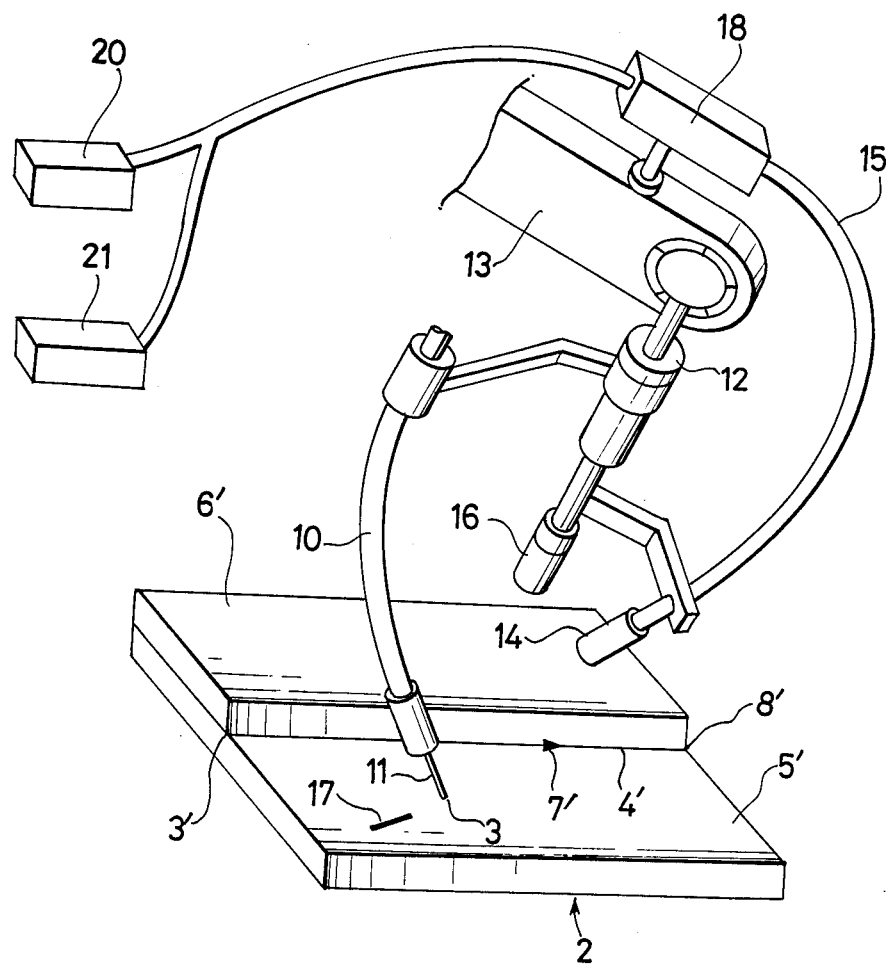
FIG. 2 is a diagram showing a situation in which a welding torch is located at a welding start point 3 taught in FIG. 1.

FIG. 2 is a diagram when the welding torch is located at the taught welding start point 3. In the diagram, 10 denotes a welding torch; 11 a wire electrode; 12 the wrist of the robot; 13 the upper arm of the robot; 14 a two-dimensional camera; 15 a cable through which a video signal (i.e., image pickup signal) of the camera is transmitted; 16 an illumination source (e.g., halogen lamp); 17 the shadow of the wire electrode 11; 18 a camera controller; 20 a monitor television; and 21 an image processor. The illumination source 16 is provided to allow the shadow 17 of the wire electrode 11 to be invariably produced without being influenced by the ambient light. The two-dimensional camera 14 serves to recognize the relation of the relative position among the welding line, the wire electrode 11 and the shadow 17.

Figure 3A:
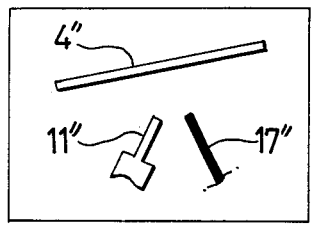
FIGS. 3A to 3G are diagrammatical views when a video signal output of a camera is observed by a TV monitor 20 in the case where a work piece is variably deviated three-dimensionally.

FIGS. 3A to 3G are diagrammatical showing a video signal output of the camera observed by the monitor television 20 in the case where a work piece is three-dimensionally displaced from the taught position. These diagrams illustrate the deviations of the welding start point 3' at the actual position of the work piece when it is seen from the welding start point 3 of the taught work position 1. In FIGS. 3A to 3G, it is assumed that the edge of the wire electrode 11 is located at the taught welding start point 3. In the following description, the left and right directions denote the lateral direction when the work piece in FIG. 2 is seen from the left. FIG. 3A shows the state in which the welding start point 3' is displaced, for example, downward to the left as seen from the side of the welding start point 3 (this state corresponds to the state shown in FIG. 2).

Figure 3B:
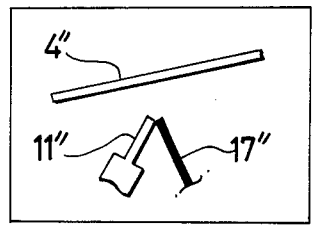

FIG. 3B shows the state in which the welding start point 3' is displaced to the left side and, at the same time, the edge of the wire electrode 11 comes into contact with the upper surface of the lower plate 5' of the work piece.

Figure 3C:
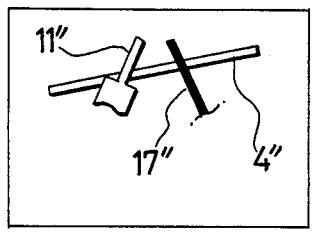

FIG. 3C shows the state in which the welding start point 3' is displaced, for example, downward to the right as seen from the side of the welding start point 3 and corresponds to the case where the edge of the wire electrode 11 is located over the upper plate 6' in FIG. 2.

Figure 3D:
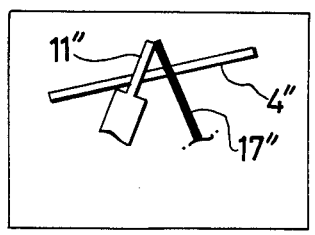

FIG. 3D shows the state in which the welding start point 3' is displaced to the right and, at the same time, the edge of the wire electrode 11 comes into contact with the upper surface of the upper plate 6' of the work piece.

Figure 3E:
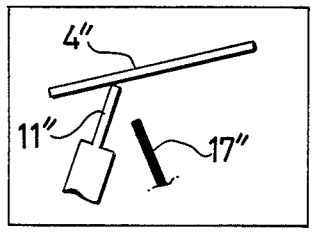

FIG. 3E shows the state in which the welding start point 3' is located below the welding start point 3, although there is no displacement in the horizontal direction between the edge of the wire electrode 11 and the welding line 4 in the image detected by the image sensor.

Figure 3F:
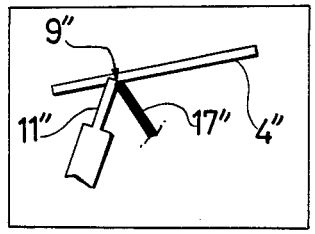

FIG. 3F shows the state in which the welding start point 3 does not coincide with the welding start point 3', although there is no displacement in the horizontal direction between the edge of the wire electrode 11 and the welding line 4' and, at the same time, the edge of the wire electrode 11 also coincides with the edge of the shadow thereof.

Figure 3G:
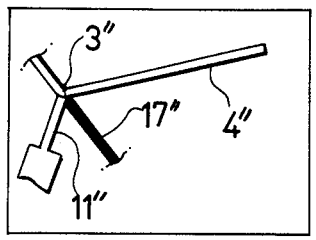

FIG. 3G shows the state in which there is no displacement in the horizontal direction between the edge of the wire electrode 11 and the welding line 4' and the edge of the wire electrode 11 coincides with the edge of the shadow thereof and, at the same time, the welding start point 3 coincides with the welding starting point 3'.

Figure 4:
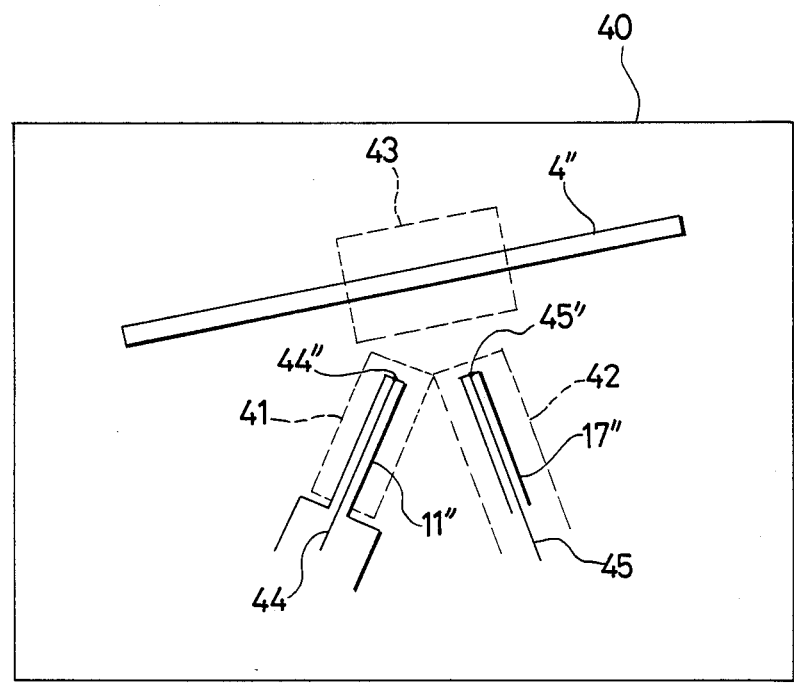
FIG. 4 is a diagram explaining the fundamental concept of the image processing method in an image processor 21.

The present invention intends to provide a method of detecting and controlling the work start point of a robot which performs, for example, welding operations. FIG. 4 is a diagram for explaining the fundamental concept of the image processing method used in the image processor 21. In the diagram, 40 denotes a frame memory of a binary video signal; 41 is a window to recognize the image of a wire electrode signal 11''; 42 a window to recognize a shadow signal 17''; 43 a window to recognize a welding line signal 4'; 44 an axial line of the wire electrode signal 11''; 44'' an edge of the axial line 44; 45 an axial line of the shadow signal 11''; and 45'' an edge of the axial line 45. The windows 41, 42, and 43 are set by the operator while observing the TV monitor 20 when the locus data (the welding start point 3 and welding line 4 at the work position 1 in FIG. 1) are taught based on variations in location of operating work pieces, i.e., variations in welding line 4'. The windows 41 to 43 are set such that, even if there are variations in work pieces as well, the work pieces exist in the windows 41, 42 and 43.

Figure 5:
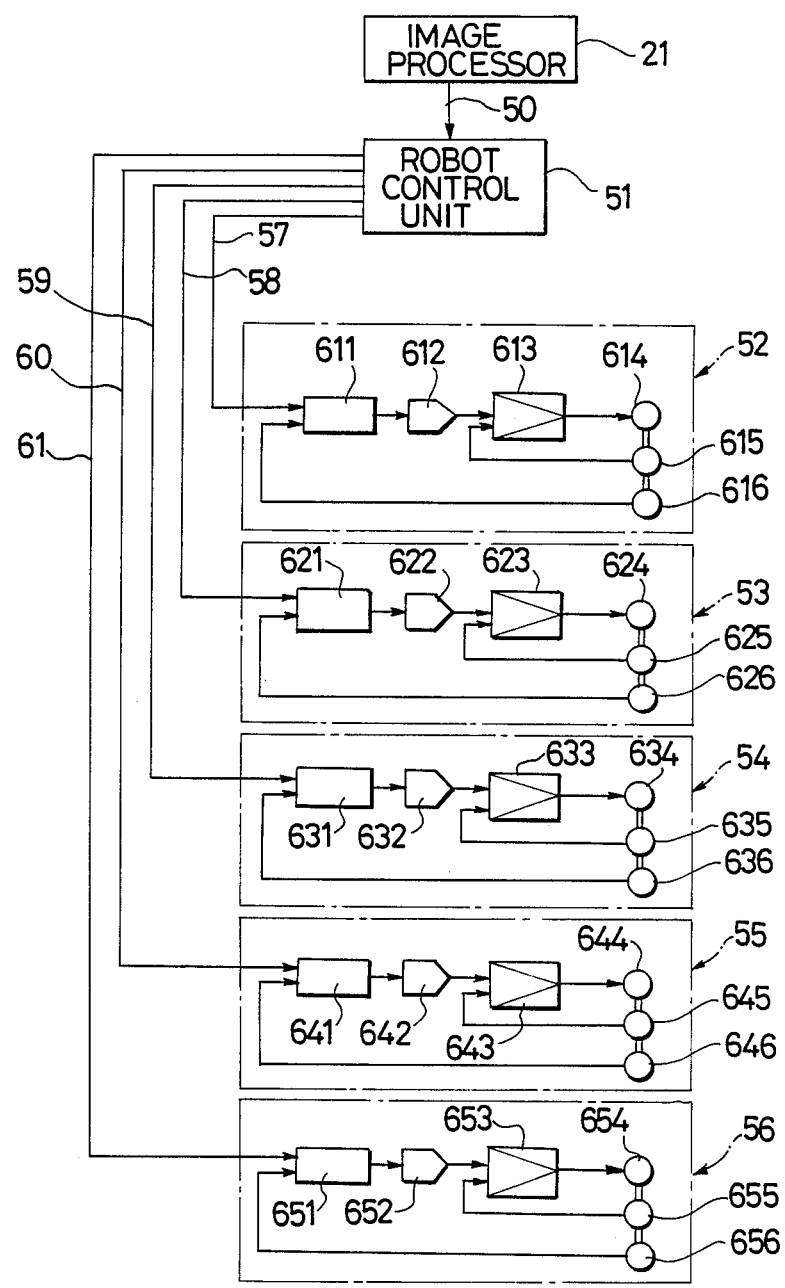
FIG. 5 is a control block diagram of a robot equipped with a sensor.

FIG. 5 is a control block diagram of a robot equipped with a sensor. 50 denotes a welding start point search command signal which is generated as a result of the image processing by the image processor 21; 51 is a robot control unit; 52 to 54 conventional position servo circuits of three fundamental axes (not shown) of the robot; 55 and 56 conventional position servo circuits of two axes (not shown) of the robot wrist; 57 to 61 command pulses to the position servo circuits 52 to 56 of the respective axes; 611, 621, 631, 641, and 651 deviation counters; 612, 622, 632, 642 and 652 digital-to-analog (D/A) converters; 613, 623, 633, 643, and 653 servo amplifiers; 614, 624, 634, 644, and 654 drive motors of said axes; 615, 625, 635, 645, and 655 tachogenerators for the speed control loops and 616, 626, 636, 646, and 656 pulse generators to detect the positions each of the axes. Each of the axial position servo circuits 52 to 56 store the differences between the command pulses 57 to 61 and the feedback pulses from the pulse generators 616, 626, 636, 646, and 656 into the deviation counters 611, 621, 631, 641, and 651. Outputs of these deviation counters and are converted to analog signals by the D/A converters 612, 622, 632, 642, and 652. The differences between the analog speed command signals as outputs of these D/A converters and the speed feedback signals from the tachogenerators 615, 625, 635, 645, and 655 are compensated and amplified by the servo amplifiers 613, 623, 633, 643, 653, thereby driving and controlling the motors 614, 624, 634, 644, and 654. As described above, the servo control is performed in a conventional manner. Due to this position servo control, the edge of the wire electrode 11 positioned at the edge of the welding torch 10 attached to the robot wrist 12 is controlled so as to follow in accordance with the command pulse.

The robot control unit 51 has a well-known linear interpolating function, disclosed in Japanese Patent Application No. 38872/1981 entitled "Control Unit of Industrial Robot of the Joint Type" filed on Mar. 18, 1981 by the same applicant as in the present invention. The robot control unit 51 also has the moving function set forth in Japanese Patent Application No. 158627/1981 entitled "Control System of Welding Robot" filed on Oct. 7, 1981 by the same applicant as the present invention. The moving function is called the shifting function to move the robot in a predetermined second correcting direction, e.g., wire electrode direction (vertical direction), and in a predetermined first correcting direction, e.g., (horizontal), direction) perpendicular to the wire electrode direction, due to the control of the three basic axes of the robot. In other words, due to the control of the robot axes, the edge of the wire electrode 11 can move at a desired speed on the straight line connecting the welding start point 3 and the welding end point 8 shown in FIG. 1. The robot control unit 51 further has the function that the edge of the wire electrode 11 can be shifted in accordance with the commands of the sensor by controlling the three fundamental axes of the robot in response to the sensor commands in the and horizontal directions in the vertical a plane vertical to the welding direction shown in FIG. 6.

When the edge 44'' of the axial line of the wire electrode signal described in FIG. 4 does not coincide with the edge 45'' of the axial line of the shadow signal 17'', the image processor 21 generates, for example, a "down" direction signal as the welding start point search command signal 50 in the case of FIGS. 3A, 3C, 3E, and 4. When the edge 44'' of the axial line is not located on the welding line signal 4'', the image processor 21 generates either a "left" or "right" direction signal as the search command signal 50. The image processor 21 generates the "left" signal in the case of FIGS. 3A, 3B, and 4 and the "right" signal in the case of FIGS. 3C and 3D. The image processor 21 sequentially receives the video signal form the camera 14 and executes the image processes and sequentially transmits the "left", "right", "up", and "lower" signals to the robot control until 51. The control unit 51 drives three fundamental axes of the robot to perform the shifting operations each time the control unit 51 receives the signal 50. Due to the above controls, the states shown in FIGS. 3A to 3E become the state of FIG. 3F.

The above description relates to the case where the edge of the wire electrode 11 is alternately moved in the first correcting direction (horizontal direction) and the second correcting direction (vertical direction). However, the edge of the wire electrode 11 may be controlled in the following manner. The movement of the wire electrode edge in the second correcting direction may be suppressed and the edge is moved in the first correcting direction until the edge of the wire electrode 11 coincides with the welding line 4' on the image. The wire electrode edge is then moved in the second correcting direction until it coincides with the edge of the shadow of the wire electrode 11 on the image. At the same time with the above movement of the wire electrode in the second correcting direction, the position of the edge of the wire electrode 11 is corrected along the first correcting direction in order to reduce the displacement between the welding line on the image and the edge of the wire electrode 11.

In place of this method, the following method may be also used.

(1) The edge of the wire electrode 11 is moved along the first correcting direction until the welding line 4' coincides with the edge of the wire electrode 11 on the image.

(2) The edge of the wire electrode 11 is moved along the second correcting direction by a constant amount in order to reduce the distance between the edge of the wire electrode 11 and the edge of the shadow of the wire electrode 11 on the image.

(3) The above steps (1) and (2) are repeated until the welding line 4', the edge of the wire electrode 11, and the edge of the shadow of the wire electrode 11 all coincide on the image.

The control from the state of FIG. 3F to the state of FIG. 3G will next be described.

FIG. 7A is a diagram explaining this control. FIG. 7B is an enlarged diagram of portion A in FIG. 7A. First, the edge of the wire electrode 11 which exists at the point 3 is moved to a point 9' on the welding line 4' due to the above operation (this state corresponds to FIG. 3F). The coordinate data $P_3(x_3, y_3, z_3)$ and $P_8(x_8, y_8, z_8)$ of the operation orthogonal system of the welding start point 3 and welding end point 8 which were taught are calculated in advance. When the robot control unit 51 receives an "(f) state" signal (not shown) from the image processor 21, the coordinate data $P_9'(x_9', y_9', z_9')$ in the operation orthogonal system of the point of the edge of the wire electrode 11 corresponding to the image point 9" in FIG. 3 is calculated from the current values of the respective axes of the robot at this time. The coordinates $P_8'''(x_8''', y_8''', z_8''')$ of a point 8''' of which the deviation vector $\Delta$ of $P_9'(x_9', y_9', z_9')$ and $P_3(x_3, y_3, z_3)$ was added to $P_8(x_8, y_8, z_8)$ are calculated. The elongated line 3'''-8''' of the straight line connecting the points 8''' and 9' is set to a reference line when moving from the point 9' to the point 3' (from the state of FIG. 3F to the state of FIG. 3G). When the welding start point search command signal 50 is not given from the image processor 21 at the point 9', the wire electrode 11 is moved along the straight line 8'''-3'''. This movement is carried out according to a conventional linear interpolating method in the manner as described in, e.g., Japanese Patent Application No. 38872/1981. As shown in the enlarged diagram of 1 FIG. 7B, when the edge of the wire electrode 11 advances to the point 9''', the edge of the wire electrode 11 does not exist on the welding line 4'. Thus, the signal 50 which is sampling image processed on an intermittent basis is generated in order to represent any of the states of FIGS. 3A to 3E. The robot control unit 51 receives the signal 50 and controls the three fundamental axes of the robot in the manner described above, thereby shifting the edge of the wire electrode 11 onto a point 9'''. Thereafter, the control unit 51 controls the three fundamental axes of the robot so that the edge of the wire electrode 11 moves in a straight line which is parallel to the straight line 8'''-3''' until the next signal 50 is given. The control in this parallel moving mode has been disclosed in detail as well-known technology in Japanese Patent Application No. 158627/1981. When the edge of the wire electrode 11 reaches a point 9'''', a shifting operation similar to the above is executed on the basis of the signal 50. Therefore, by repeating these operations, the wire electrode edge reaches the point 3'. In this way, the operation to detect the welding start point is completed.

Figure 8A:
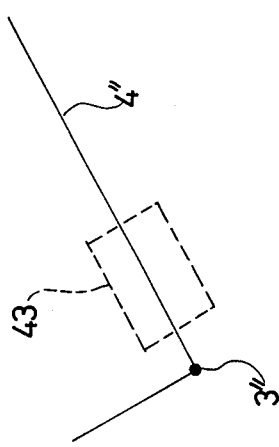
FIGS. 8A and 8B are diagrams explaining a method of recognizing an image at a welding start point 3' from a binary image 3" at the welding start points 3'.
Figure 8B:
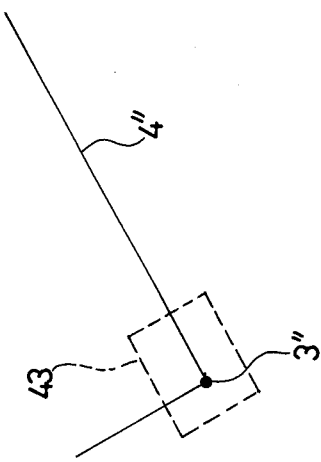

FIGS. 8A and 8B are diagrams explaining a method whereby the image at the welding start point 3' is recognized from a binary image 3" at the welding start point 3'. In association with the movement of the edge of the wire electrode 11 from the point 9' to the point 3' described with reference to FIGS. 7A and 7B, a camera 14 also moves along the welding lines 4', wherein the camera 14 is fixed to the robot wrist 12 in order to have a predetermined geometrical relation with regard to the wire electrode 11 as shown in FIG. 2. Therefore, the window 43, which has already been described in FIG. 4, also moves along the welding line 4', i.e., from 4" to 3" on the screen. When the window 43 moves from the state of FIG. 8A to the area including the point 3" as shown in FIG. 8B, the point at which the image line connecting with the point 4" suddenly changes can be recognized as the welding start point 3", i.e., point 3'. The edge of the wire electrode 11 is positioned at the welding start point 3' derived in this manner and thereafter actual welding is started along the welding line (3'-8'). In execution of actual welding along a locus, two methods can be considered.

(1) The first method:

A reverse straight line locus from 9' to 3' is stored in advance in a memory (not shown) and the welding locus is obtained according to the linear interpolating method on the assumption that the welding end point 8' exists on the elongated line of the welding line 3'9'.

(2) The second method:

Copy welding is executed from the welding start point 3' by use of a sensor.

However, since these welding methods are not directly related to the feature of the present invention, their descriptions are omitted in this specification. The deviation of the work piece is exaggeratedly and enlargedly illustrated in FIGS. 1, 2, 7A, and 7B compared to the actual displacement of the work piece for convenience of explanation. However, the actual displacement is at most a few millimeters. Therefore, there is no need to consciously distinguish the point 9' from the point 3'. In this a case, the movement of the wire electrode edge from the state of FIG. 3F to the state of FIG. 3G becomes unnecessary and the point 9' may be set at the welding start point and the operations described with reference to FIGS. 7A, 7B, 8B, and 8B may be omitted as well. It should be noted that, even if the work piece is not deviated, or even when the relative position between the camera 14 and the wire electrode 11 is also displaced due to certain causes (for example, due to the play of the attaching mechanism around the robot wrist in FIG. 2, and other movements) as well, it is possible to execute a series of correct control operations to the states of FIGS. 3F and 3G described with reference to FIGS. 3A to 3G as long as the lines 44, 45, and 4" exist in each of set windows. In other words, it is a typical feature of this invention that, even when the work piece is deviated or even when the relative position between the sensor and the robot is also deviated, the edge of the wire electrode 11 can be positioned at the welding start point 3'.

Figure 6:
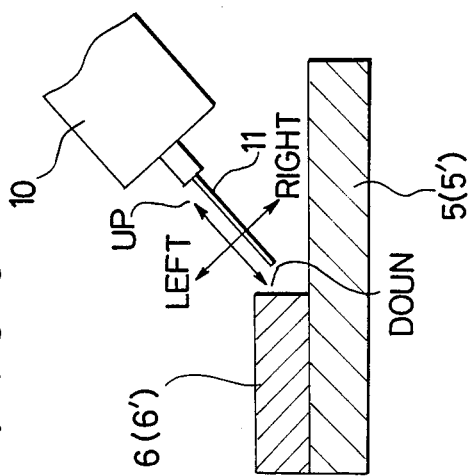
FIG. 6 is a diagram showing vertical and horizontal movements in vertical cross section in the welding direction of a welding torch.

It should be noted that the camera 14 is obliquely arranged in front of the wire electrode 11 and the welding line 4' and that, strictly speaking, it generates none of the "up", "down", "left", and "right" signals in the cross sectional area which is perpendicular to the welding line direction 7' described in FIG. 6. The video signals 4", 11", and 17" correspond to the images projected onto the camera surface of the actual welding line 4', the actual wire electrode 11, and the actual shadow 17, so that these video signals are reduced by only the amounts of sine or cosine of the angles between the camera surface and the actual welding line 4', the actual wire electrode 11, and the actual shadow 17, respectively. However, this reduction results in the problem of the sensitivity of the sensor and only the sizes and values of the dimensions of the projected image of the actual welding line 4', the actual wire electrode 11, and the actual shadow 17 change. If the resolution of the camera sensor in the "left", "right", "up", and "down" directions is better than the necessary positioning accuracies of the robot, the camera sensor will not detect errors. In other words, if a camera sensor has the resolution which is sufficient to correctly recognize the states shown in FIGS. 3A to 3G, there is no need to execute the correcting calculations of the angles between the camera surface and the welding line 4', the wire electrode 11, and the shadow 17 thereof. If this condition is satisfied, by use of the well-known technology of "Control System for a Robot which can Follow in response to "Left", "Right", "Up", and "Down" Direction Commands which are Generated from a Sensor", disclosed in detail in Japanese Patent Application No. 158627/1981, the robot drive shafts can be controlled in a zero-method manner in response to commands from the camera sensor, and the edge of the wire electrode 11 can be positioned on a desired welding line 4'.

An explanation was made above with respect to the shape of the work piece in FIG. 1 in conjunction with the arrangement of the equipment shown in FIG. 2. The case in which a plurality of welding start points exist will next be described. FIG. 9 shows an example of a work piece set at an instructed work position 101. In the diagram, 103A and 103B denote welding start points; 104A and 104B welding lines; 105 a lower plate to which welding lines are formed; 106A and 106B upper plates or upper base materials; 107A and 107B arrows indicating the welding directions; 108A and 108B welding end points; and 110 a rotating motor (hereinafter referred to as an R axis or R axis data) to rotate the camera 14 around the robot wrist as a rotational center and a position detector. The welding directions 107A and 107B are substantially opposite directions. The camera 14 observes the welding lines 104A and 104B, the wire electrode 11, and the shadow 17 thereof from the oblique forward direction of the welding line direction. Therefore, as for the positional relation of the camera 14, the camera 14 is rotated by almost 180° by the R axis motor 110 from the welding start point 103A to the welding start point 103B. Since the welding line 104A is constituted by an arc-like curve, the positioning operations of the wire electrode 11 at the welding start points 103A and 103B can be executed in substantially the same manner as described above except that the parallel moving mode during locus motion, which is equivalent to the locus motion from the point 9' to the point 3' described in FIGS. 7A and 7B, is carried out on the basis of the arc interpolation instead of a straight line. When instructing, the operator determines the operations to set the angle of rotation of the R axis and to set the windows based on variations in the work piece while observing the TV monitor 20. When the R axis is driven, the video signals 4", 11", and 17" in FIG. 4 rotate. The windows 41 to 43 are decided based on variations of the video signals 4", 11", and 17" after rotation. The taught values of the windows 41, 42, and 43 shown in FIG. 4 near the welding start points 103A and 103B are stored in a RAM memory of the image processor 21 as the coordinate values based on the camera coordinate system (not shown in this specification). Upon playback, these coordinate data are read out of the RAM memory corresponding to the taught welding start points 103A and 103B. The actual video signals 4", 44", and 45" in the windows 41 to 43, respectively, are image processed and recognized.

To facilitate the instructing operation by the operator, there is also considered a method whereby the operator merely instructs only the position of the R axis near each welding start point in such a manner that the welding line signal 4", the wire electrode signal 11", and the shadow signal 17" thereof properly exist in the frame memory 40 while observing the TV monitor 20. In this case, a function to automatically produce the windows 41 to 43 is needed.

Since the illumination source 16 is directly coupled with the R axis as shown in FIG. 9, the illuminating directions does not change according to the rotation of the R axis. Therefore, it is necessary to calculate the positions of the video signals 4", 11", and 17" in the frame memory 40 due to the driving of the R axis on the basis of the geometrical relation among the optical axis of the camera coupled to the R axis, the direction of the torch axial line coupled to the robot wrist 12 (i.e., the direction of the wire electrode 11), and the work surface onto which the shadow of the wire electrode is produced, and to calculate the windows 41 to 43 having allowable variation widths. Since these calculations can be performed by conventional mathematical techniques, only the concept thereof is mentioned here and its detailed description is omitted in this specification.

When the R axis is necessary, it is sufficient to merely add an R axis position servo circuit having the same constitution as the five axes of the robot to the constitution shown in FIG. 5 as a control circuit of the R axis. If there is a limitation in the R axis operating range and the shadow signal 17" is not produced at the proper location in the frame memory 40 because of the problem of interference between the camera and the work piece, the wire electrode can be led to the welding start point by use of well-known technology (e.g., Japanese Patent Laid-opn Publication NO. 22488/1980) in which the control of the "left" and "right" directions (i.e., position matching control between 44" and 4" in FIG. 4) is carried out in a manner similar to the above, and the control in the "up" and "down" directions is executed accordingly due to the contact between the wire electrode 11 and the base material.

The present invention has been described above using a camera as an example. However, the invention can also obviously be applied to a system in which a small-size and light-weight viewing device such as a fiberscope is attached to the robot wrist and an image pickup signal at the edge of the fiberscope is transmitted to a camera arranged at a remote position (e.g., to the upper arm of the robot).

As will be readily understood from the above description, according to the invention, even if the operating work piece is displaced or if the robot wrist side is also displaced, the relative position between the work point of the work tool and the work start point of the work piece can be matched. Consequently, strict management of the accuracies of work pieces and of the positions when work tools are exchanged become unnecessary and the work can be automated and simplified.

Although the present invention has been shown and described with respect to a preferred embodiment, various changes and modifications which are obvious to a person skilled in the art to which the invention pertains are deemed to lie within the spirit and scope of the appended claims.

What is claimed is:

1. A method of detecting a work start point in a robot of the teaching playback control type having an interpolating function in which a work tool is attached to an edge of an arm and a visual sensor is provided for the wrist portion of said arm and a contact sensor is provided for generating a contact signal when an edge of said work tool comes into contact with an object to be worked is further provided, whereby a plurality of drive shafts constituting the robot are controlled in response to position correcting signals from said visual sensor, thereby adjusting a position of said work tool, said method comprising the steps of:

(1) using said visual sensor to image-recognize a work line of said work object and said work tool;

(2) generating said position correcting signal, in a first correcting direction, for reducing a first distance between said work line and said edge of said work tool on the basis of said image recognized by said visual sensor;

(3) moving said edge of said work tool along said first correcting direction in response to said position correcting signal until said work line and said edge of said work tool substantially coincide on said recognized image; and (4) moving said edge of said work tool along an axial direction of said work tool until said contact sensor generates a contact signal and, at the same time, correcting a position of said edge of said work tool along said first correcting direction until said work line and said edge of said work tool on said image substantially coincide.

2. A method of detecting a work start point in a robot of the teaching playback control type having an interpolating function in which a work tool is attached to an edge of an arm and a visual sensor is provided for a wrist portion of said arm and a contact sensor is provided for generating a contact signal when an edge of said work tool comes into contact with an object to be worked, whereby a plurality of driven shafts constituting the robot are controlled in response to position correcting signals from said visual sensor, thereby adjusting a position of said work tool, said method comprising the steps of:

(1) using said visual sensor to image-recognize a work line of a work object and said work tool;

(2) generating a position correcting signal, in a first correcting direction, for reducing a first distance between said work line and said edge of said work tool on the basis of said image recognized by said visual sensor;

(3) moving said edge of said work tool along said first correcting direction in response to said position correcting signal until said work line and said edge of said work tool substantially coincide on said recognized image;

(4) moving said edge of said work tool by a constant distance along an axial direction of said work tool in a direction toward said contact sensor so that said contact sensor will generate a contact signal; and (5) repeating said steps (3) and (4) until said work line and said edge of said work tool substantially coincide on said recognized image, and said contact signal is generated.

3. A method of detecting a work start point of a robot of the teaching playback control type having an interpolating function in which a work tool is attached to an edge of an arm and an illumination source and a visual sensor are provided for a wrist portion of said arm, whereby a plurality of drive shafts constituting the robot are controlled in response to position correcting signals from said visual sensor, thereby adjusting a position of said work tool, said method comprising the steps of:

(1) using said illumination source to produce a shadow of said work tool;

(2) using said visual sensor to image-recognize a work line of a work object, said work tool, and said shadow of said work tool;

(3) generating said position correcting signals along first and second correcting directions from said visual sensor on the basis of said image recognized by said visual sensor;

(4) moving an edge of said work tool along said first correcting direction in response to said position correcting signal, in order to reduce a distance between said work line and said edge of said work tool on said recognized image;

(5) moving said edge of said work tool along said second correcting direction in response to said position correcting signal, in order to reduce a distance between said edge of the work tool and an edge of the shadow of the work tool on said recognized image;

(6) repeating said steps (4) and (5) until said work line, said edge of said work tool, and said edge of the shadow of the work tool all substantially coincide on said recognized image; and (7) again repeating said steps (4) and (5) until said visual sensor detects a sharp bend in said work line on said recognized image while tracing an extension of a straight line connecting a point at which a taught work end point is displaced by a vector between a coincident point derived in said step (6) and said taught work start point to said coincident point in a direction opposite to a taught work direction.

4. A method of detecting a work start point of a robot of the teaching playback control type having an interpolating function in which a work tool is attached to an edge of an arm, and an illumination source and a visual sensor are provided for a wrist portion of said arm, whereby a plurality of drive shafts constituting the robot are controlled in response to position correcting signals from said visual sensor, thereby adjusting the position of said work tool, said method comprising the steps of:

(1) using said illumination source to produce a shadow of an edge of said work tool;

(2) using said visual sensor to image-recognize a work line of a work object, said work tool, and said shadow of said edge of said work tool;

(3) generating a first position correcting signal, in a first correcting direction for reducing a first distance between said work line and said edge of said work tool, and generating a second position correcting signal, in a second correcting direction for reducing a second distance between said edge of said work tool and said shadow of said edge of said work tool;

(4) moving said edge of said work tool by a constant distance along said first correcting direction in response to said first position correcting signal to reduce said first distance;

(5) moving said edge of said work tool by a constant distance along said second correcting direction in response to said second position correcting signal to reduce said second distance; and (6) repeating said steps (4) and (5) until said work line, said edge of said work tool, and said shadow of said edge of said work tool all substantially coincide on said recognized image.

5. A method of detecting a work start point of a robot of the teaching playback control type having an inderpolating function in which a work tool is attached to an edge of an arm, and an illumination source and a visual sensor are provided for a wrist portion of said arm, whereby a plurality of drive shafts constituting the robot are controlled in response to position correcting signals from said visual sensor, thereby adjusting a position of said work tool, said method comprising the steps of:

(1) using said illumination source to produce a shadow of an edge of said work tool;
(2) using said visual sensor to image-recognize a work line of a work object, said work tool, and said shadow of said edge of said work tool;
(3) generating a first position correcting signal, in a first correcting direction, said first position correcting signal for reducing a first distance between said work line and said edge of said work tool, and generating a second position correcting signal, in a second correcting direction, said second position correcting signal for reducing a second distance between said edge of said work tool and said shadow of said edge of said work tool;
(4) moving said edge of said work tool along said first correcting direction in response to said position correcting signal to reduce said first distance;
(5) moving said edge of said work tool along said second correcting direction in response to said position correcting signal to reduce said second distance;
(6) repeating said steps (4) and (5) until said work line, said edge of said work tool, and said edge of said shadow of said work tool all substantially coincide on said recognized image; and
(7) obtaining a displaced point at which a work end point is displaced by a vector between a coincident point as derived in said step (6) and a work start point, and deriving a straight line connecting said displaced point and said coincident point;
(8) moving said edge of said work tool along an extension of said straight line and in a direction opposite to a direction in which said work is progressing;
(9) again repeating said steps (4) and (5) until said work line, said edge of said work tool and said shadow of said edge of said work tool all substantially coincide on said recognized image;
(10) repeating said steps (8) and (9) until said recognized image of said visual sensor indicates a sharp bend in said work line;
(11) again repeating said steps (4) and (5) until said work line, said edge of said work tool and said shadow of said edge of said work tool, all substantially coincide on said recognized image after said sharp bend is detected.

6. A method of detecting a work start point of a robot of the teaching playback control type having an interpolating function in which a work tool is attached to an edge of an arm and an illumination source, and a visual sensor are provided for a wrist portion of said arm, whereby a plurality of drive shafts constituting the robot are controlled in response to position correcting signals from said visual sensor, thereby adjusting a position of said work tool, said method comprising the steps of:

(1) using said illumination source to produce a shadow of an edge of said work tool;
(2) using said visual sensor to image-recognize a work line of a work, said work tool, and said shadow of said edge of said work tool;
(3) generating a first position correcting signal, in a first correcting direction, for reducing a first distance between said work line and said edge of said work tool, and generating a second position correcting signal, in a second correcting direction, for reducing a second distance between said edge of said work tool and said shadow of the edge of said work tool;
(4) moving said edge of said work tool along said first correcting direction, responsive to said position correcting signal, until said work line and said edge of said work tool substantially coincide on said recognized image;
(5) moving said edge of said work tool along said second correcting direction in response to said position correcting signal until said edge of said work tool and an edge of said shadow of said work tool substantially coincide on said recognized image; and
(6) at the same time as said step (5), correcting said position of said edge of said work tool along said first correcting direction until said work line and said edge of said work tool on said image substantially coincide.

7. A method of detecting a work start point of a robot of the teaching playback control type having an interpolating function in which a work tool is attached to an edge of an arm, and an illumination source and a visual sensor are provided on a wrist portion of said arm, whereby a plurality of drive shafts constituting the robot are controlled in response to position correcting signals from said visual sensor, thereby adjusting a position of said work tool, said method comprising the steps of:

(1) using said illumination source to produce a shadow of an edge of the work tool;
(2) using said visual sensor to image-recognize a work line of a work object, said work tool, and said shadow of said edge of said work tool;
(3) generating a first position correcting signal, in a first correcting direction, for reducing a first distance between said work line and the edge of said work tool, and generating a second position correcting signal, in a second correcting direction, for reducing a second distance between said edge of said work tool and said shadow of said edge of said work tool;
(4) moving said edge of said work tool along said first correcting direction in response to said position correcting signal until said work line and said edge of said work tool substantially coincide on said recognized image;
(5) moving said edge of said work tool along said second correcting direction in response to said position correcting signal until said edge of said work tool and said shadow of said edge of said work tool substantially coincide on said recognized image and, at the same time, correcting a position of said edge of said work tool along said first correcting direction until said work line and said edge of said work tool on said image substantially coincide; and
(6) obtaining a displaced point at which a taught work end point is displaced by a vector between a coincident point as derived in said step (5) and a taught work start point, and deriving a stright line connecting said displaced point and said coincident point;
(7) moving said edge of said work tool by a constant distance along an extension of said straight line and in a direction opposite to a direction in which said work is progressing;

(8) repeating said steps (4) and (5) until said work line, said edge of said work tool and said shadow of said edge of said work tool all substantially coincide on said recognized image; and (9) repeating said steps (7) and (8) until said visual sensor detects a sharp bend in said work line on said recognized image.

* * * * *